United States Patent
Smith et al.

(10) Patent No.: US 6,974,614 B2
(45) Date of Patent: Dec. 13, 2005

(54) LOW PERMEATION HIGH DENSITY POLYETHYLENE TUBE WITH ALUMINUM BARRIER LAYER

(75) Inventors: Christopher W. Smith, Lexington, TN (US); Jerry Shifman, Wildersville, TN (US); Jeremy Duke, Lexington, TN (US); John E. Mobley, Lexington, TN (US)

(73) Assignee: Dayco Products, LLC, Miamisburg, OH (US)

( * ) Notice: Subject to any disclaimer, the term of this patent is extended or adjusted under 35 U.S.C. 154(b) by 85 days.

(21) Appl. No.: 10/621,231

(22) Filed: Jul. 15, 2003

(65) Prior Publication Data

US 2004/0028861 A1  Feb. 12, 2004

Related U.S. Application Data

(63) Continuation-in-part of application No. 09/951,091, filed on Sep. 13, 2001, now Pat. No. 6,652,939, which is a continuation-in-part of application No. 10/621,230, filed on Jul. 15, 2003.

(51) Int. Cl.$^7$ .............................................. B32B 27/32

(52) U.S. Cl. ...................................... 428/35.9; 428/461
(58) Field of Search ............................... 428/35.9, 461

(56) References Cited

U.S. PATENT DOCUMENTS

| | | | |
|---|---|---|---|
| 318,458 A | 5/1885 | Fletcher | |
| 4,481,262 A * | 11/1984 | Shida et al. | 428/441 |
| 4,559,793 A | 12/1985 | Geweniger | |
| 4,606,952 A | 8/1986 | Sugimoto et al. | |
| 4,758,455 A | 7/1988 | Campbell et al. | |
| 4,779,673 A | 10/1988 | Chiles et al. | |
| 5,182,147 A | 1/1993 | Davis | |
| 5,271,977 A | 12/1993 | Yoshikawa et al. | |
| 5,360,037 A | 11/1994 | Lindstrom | |
| 5,398,729 A | 3/1995 | Spurgat | |
| 5,430,603 A | 7/1995 | Albino et al. | |
| 5,476,121 A | 12/1995 | Yoshikawa et al. | |
| 5,488,975 A | 2/1996 | Chiles et al. | |
| 6,074,717 A | 6/2000 | Little et al. | |

FOREIGN PATENT DOCUMENTS

| | | | | |
|---|---|---|---|---|
| DE | 4405409 C1 * | 8/1995 | | B60K 15/04 |
| GB | 2258767 A * | 2/1993 | | G02B 6/44 |

* cited by examiner

*Primary Examiner*—Sandra Nolan Rayford
(74) *Attorney, Agent, or Firm*—Joseph V. Tassone; J. Daniel Lykins

(57) ABSTRACT

A fuel transport tube having improved fuel vapor permeation characteristics comprising an inner conductive high density polyethylene tubular structure, an aluminum barrier layer on the outside surface of the high density polyethylene inner tubular layer, and a non-conductive thermoplastic layer on the outer surface of the aluminum layer; and a method for making the fuel transport tube are disclosed.

16 Claims, 2 Drawing Sheets

LOW PERMEATION HIGH DENSITY POLYETHYLENE TUBE WITH ALUMINUM BARRIER LAYER

RELATED APPLICATIONS

This application is a continuation-in-part (CIP) of U.S. Ser. No. 09/951,091, filed Sep. 13, 2001, now U.S. Pat. No. 6,652,937. Filed concurrently with this CIP is a second CIP of Ser. No. 09/951,091, which CIP is U.S. Ser. No. 10/621, 230 filed Jul. 15, 2003, entitled "Low Permeation Nylon Tube with Aluminum Barrier Layer".

BACKGROUND OF THE INVENTION

The present invention relates to the field of tubes, and particularly to the field of automobile fuel and vapor transmission tubes having reduced permeability to such fuel and vapor. More particularly, the invention relates to multilane high density polyethylene fuel transport tubes which have a thin aluminum barrier layer between an inner conductive high density polyethylene tube and an outer non-conductive thermoplastic tube, and to the use of such fuel transport tubes to reduce the amount of fuel vapor released to the atmosphere from motor vehicles.

Recent environmental regulations imposed on the automotive and on the fuel delivery industries severely limit the amount of fuel vapor that can permeate from the fuel system of motor vehicles and from the fuel delivery hoses used to transport such fuels. For example, these regulations require that all new automobiles sold in states where this regulation are in effect must pass a vehicle permeation test designated as the S.H.E.D TEST, which measures the emissions, i.e., fuel vapors, from a motor vehicle with the engine not running. Under this regulation, a maximum of 2 grams of vapor emission per 24 hours period is allowable. Such emissions are those permeating from the fuel hoses and any other parts of the fuel supply system.

Typically, fuel transfer hoses, in the past, have been constructed of natural or synthetic rubber material such as butadiene-acrylonitrile rubber or the like. Other hoses have been constructed using a fluoroelastomer as an inner wall surface layer of the hose and some other material as the outer layer. Such hoses have a high permeability to fuel vapor. Attempts to produce fuel transport hoses with reduced permeability to fuel vapors have included the use of corrugated polyamide and fluorocarbon containing-thermoplastic tubes. However, these structures are presently considered to be only marginally effective to reduce the permeability of fuel vapors while being relatively expensive.

Others have attempted to produce a fuel hose with reduced permeability to fuel vapors by using a tetrafluoroethylene-hexafluoropropylene-vinylidine fluoride terpolymer liner and a thicker layer of hexafluoropropylene-vinylidine fluoride copolymer or other suitable elastomer as the conductive inner part of the tube. For example, such hoses are discussed in U.S. Pat. No. 4,606,952 to Sugimoto and U.S. Pat. No. 5,430,603 to Albino et al. Such hose structures though have a tendency to wrinkle on the inner radius of the forming mandrel or pin causing an undesirable and discernable defect which may also exhibit a weakened area in the hose.

A number of prior art patents disclose flexible hoses incorporating metallic layers of one type or another to reduce permeability of various materials. Such disclosures appear, for example, in U.S. Pat. No. 318,458 to Fletcher, where there is disclosed a multilayer tubular structure made from India rubber and having a tin foil liner. Other prior art patents such as U.S. Pat. No. 4,559,793 to Hane et al.; U.S. Pat. No. 4,758,455 to Campbell et al.; U.S. Pat. No. 5,182, 147 to Davis; U.S. Pat. No. 5,271,977 to Yoshikawa et al.; U.S. Pat. No. 5,360,037 to Lindstrom; and U.S. Pat. No. 5,398,729 to Spurgat have attempted similar methods to reduce permeability of fluids and/or gases through various tubes. Typically, such prior art hoses are constructed by coating a metal strip on both sides with an adhesive which may, for example, be an adhesive made from a copolymer of ethylene and a monomer having a reactive carboxyl group. Commonly assigned U.S. Pat. No. 6,074,717 to Little et al., and U.S. Pat. Nos. 4,779,673 and 5,488,975 to Chiles et al disclose synthetic rubber hoses used for circulation of fluids in radiant heating systems in houses and businesses. Chiles U.S. Pat. No. 5,488,975 discloses a flexible heating system hose having an oxygen barrier layer which may be aluminum. U.S. Pat. No, 5,476,121 to Yoshikawa et al. teaches a low permeable rubber hose having a barrier layer of silver or silver alloy formed by wet plating or dry plating with ion plating or sputtering. None of these art references teach a flexible fuel hose having an aluminum barrier layer bonded to a conductive NBR inner tube and to an elastomeric adhesion layer which might serve as a cover, wherein the rubber layers are vulcanized to prevent delamination.

Choosing the right combination of materials to be used in the construction of fuel hoses, such as fuel filler hoses and fuel filler neck hoses is becoming more and more difficult. Therefore, an urgent need exists, particularly in the automotive and fuel delivery industries for a fuel hose which prevents permeation of fuels and vapor and which resists delamination under stress over long periods of time while maintaining manufacturing costs at an acceptable level.

SUMMARY OF THE INVENTION

The present invention provides a fuel tube for transporting fuel in fuel systems. The tubular structure of the invention is particularly constructed to prevent permeation of fuel vapor into the environment and to prevent delamination under stress for a long period of time. In accordance with the invention, the fuel hose has a layer of aluminum sandwiched between a conductive high density polyethylene inner tubular structure and an outer non-conductive thermoplastic tubular structure which may serve as a protective cover for the fuel hose.

Copending U.S. patent application Ser. No. 09/951,091 filed Sep. 13, 2001 describes the use of an aluminum barrier layer sandwiched between a conductive nylon inner layer and a non-conductive nylon outer layer which nay serve as a protective cover. Nylon is a generic name for a family of polyamides generally characterized by the presence of the amide group, —CONH. Not all nylons are polyamide resins, nor are all polyamide resins nylons. Typically, nylons have been prepared in the past by the condensation of a dicarboxylic acid and a diamine. For example, nylon 66 is prepared by the condensation reaction of the six-carbon dicarboxylic acid, adipic acid and the six-carbon diamine, hexamethylenediamine. Nylon 610 is commonly prepared by the condensation reaction of sebasic acid, a 10-carbon dicarboxylic acid, and hexamethylenediamine. Other nylons such as nylon such as nylon 4, nylon 6 and nylon 9 are obtained by polymerization of butyrolactam, caprolactam and 9-aminononanoic acid, respectively. Nylons generally have good electrical resistance, but readily accumulate static charges.

The nylons employed in U.S. patent application Ser. No. 09/951,091 include nylon 4, nylon 6, nylon 66, nylon 610, nylon 9, nylon 11, nylon 12, etc. The nylon used to construct the inner conductive tubular structure and the outer non-conductive layer may be the same or different. Preferably, nylon 12 is used to construct both the inner conductive tubular structure and the outer non-conductive layer. The nylon used to prepare the inner conductive tube contains an agent which imparts conductivity to the nylon. Typically, the conductive agent is carbon black, but may be any conductive agent or combination of conductive agents commonly recognized in the industry to provide conductivity to a rubber or plastic material. Examples of such conductive agents include elemental carbon, metals such as copper, silver, gold, nickel, and alloys of such metals. Preferably, the conductive agent is elemental carbon which is commonly referred to in the art as carbon black.

In accordance with the present invention, the inner conductive layer is formed of a polyolefin, preferably, polyethylene, and most preferably the inner conductive layer is a high density polyethylene (HDPE) containing a conductive agent which may be carbon or any of the other conductive materials mentioned above which are commonly used as a conductive agent in the production of hoses requiring that a conductive material be incorporated therein to dissipate any static electricity buildup that may occur during the transport of flammable liquids or vapors. In a preferred aspect of the present invention, the conductive agent is carbon in the form of fibers or fibrils. Such carbon fibers and carbon fibrils are more fully described in the detailed description of the invention. Although carbon fibers or carbon fibrils are particularly preferred as the conductive material, metal fibers, mixtures of metal fibers and metal alloy fibers may also be used.

The outer non-conductive layer of the present tubular structure is a material constructed from any of the rubber or thermoplastic materials customarily used a cover material for the tubular structure such as nylon, chlorinated polyethylene, chlorosulfonated polyethylene, styrene-butadiene rubber, butadiene-nitrile rubber, nitrile-polyvinyl chloride, EPDM, neoprene, vinylethylene-acrylic rubber, acrylic rubber, epichlorohydrin rubber, copolymers of epichlorohydrin and ethylene oxide, polychloroprene rubber, polyvinyl chloride, ethylene-propylene copolymers, ultra high molecular weight polyethylene, high density polyethylene, chlorobutyl rubber, and blends thereof.

In addition to the conductive high density polyethylene inner tube, the aluminum layer and the non-conductive outer tube, the hose of the present invention may contain a first tie layer between the inner conductive high density polyethylene tube and the aluminum barrier layer, and a second tie layer between the aluminum barrier layer and the outer non-conductive tube to prevent delamination of the layers. The tie layers may be of the same material or they may be of different materials. Typically, the tie layers are any of the materials known in the art which will adhere to the High density polyethylene conductive layer and the aluminum barrier layer, and to the aluminum barrier layer and to the outer non-conductive layer. The tie layer may be required or, at least desired, to prevent delamination of the inner conductive high density polyethylene tube from the inner surface of the aluminum barrier layer, and to prevent delamination of the outer non-conductive tube from the outer surface of the aluminum barrier layer.

DETAILED DESCRIPTION OF THE INVENTION

Figure 1:
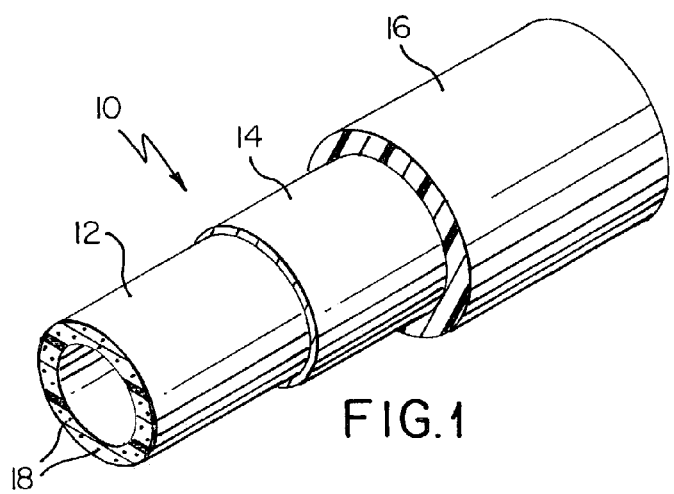
FIG. 1 is a perspective view of a tubular structure of the present invention comprising an aluminum barrier layer sandwiched between a conductive high density polyethylene inner tube and an non-conductive outer tube.
Figure 2:
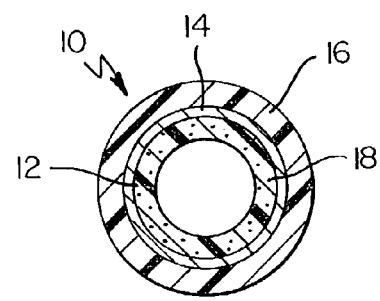
FIG. 2 is an end view of the tubular structure shown in FIG. 1.

In accordance with the invention, a fuel transport tube is provided which not only meets present low permeability standards, but also exhibits increased resistance to delamination during extended use. A fuel hose manufactured in accordance with the present invention is illustrated in FIGS. 1 and 2, wherein a fuel tube 10 has an inner tubular structure 12 comprising a conductive high density polyethylene, an aluminum barrier layer 14 surrounding the outermost surface of the conductive high density polyethylene tube 12, and a non-conductive outer tubular structure 16 adjacent to and surrounding the outermost surface of the aluminum barrier layer 14.

It has been found that the tubular structures of the present invention significantly reduce the permeation of fuel vapor as well as providing for extended tube life due to the unique tubular structure wherein a layer of aluminum 14 is sandwiched between an inner tubular structure 12 made from a conductive high density polyethylene and an outer tubular structure 16 made from a non-conductive material. The inner conductive high density polyethylene tubular structure 12 can have a wall thickness of up to about 2 mm. Preferably, the wall thickness of the inner conductive high density polyethylene tubular structure 12 is about 0.2 to 1.5 mm, and most preferably about 0.5 to 1.25 mm. While other polyolefins, e.g., polyethylene may be used in the present invention, high density polyethylene is highly preferred.

Typically, the inner conductive high density polyethylene tube 12 is rendered conductive by introducing a conductive agent into the high density polyethylene material prior to forming the inner tubular structure 12. The conductive agent 18 can be any of the conductive agents known in the art, such as elemental carbon, copper, silver, gold, nickel, and alloys of such metals or any combination of conductive agents which will provide the necessary conductivity characteristic to the inner high density polyethylene tube 12. In a preferred aspect of the invention, the conductive agent 18 is carbon, in the form of fibers or fibrils. Carbon fibers or carbon fibrils typically have a high ratio of length to diameter, e.g., on the order of several hundred to one. Carbon or graphite fibers normally have a diameter of several microns, most generally in the range of about 7 to 8 microns. The carbon or graphite fibrils have been described as extremely fine fiber or cell-like nano-particles formed during the first stages of gel formation. The amount of conductive agent 18 in the high density polyethylene material used to make the inner conductive tube 12 may vary widely and should be in an amount sufficient to provide effective conductivity to the tubular structure, but not in excessive amounts which would tend to make the high density polyethylene material difficult to process. Typically, the amount of conductive material will be used in amounts up to about 20 weight percent depending upon the particular conductive agent, the form of the conductive agent and the application of the conductive tubular structure. However, the most effective amount of conductive agent will range from about 0.2 to 20 weight percent. Carbon fibers or carbon fibrils in an amount of about 2 to 20 weight percent has been found to be especially useful in carrying out the invention.

The aluminum barrier layer 14 is a thin layer of aluminum having a thickness of about 0.02 to 1.5 mm or thicker, and preferably about 0.2 to 1.5 mm. In a preferred aspect of the invention, the inner high density polyethylene tubular structure 12 is wrapped by a layer of aluminum foil 14. This may be accomplished by helical wrapping or by tensioned radial curling. Alternatively, a thin layer of aluminum 14 may be deposited around the outer surface of the inner nylon tubular structure 12 by electrolytic deposition.

According to the invention the outer surface of the aluminum barrier layer 14 is covered with a non-conductive polymeric tube 16 which may be a thermoplastic material or a rubber material. The polymeric material used to form the non-conductive tube 16 can be the same high density polyethylene material used to form the conductive inner tubular structure 12 or it can be a different material such as a different high density polyethylene; a nylon such as nylon 4, nylon 6, nylon 66, nylon 610, nylon 9, nylon 11, nylon 12, etc.; or any other suitable material which would be effective as a non-conductive layer in the present invention. Typically, the non-conductive tube 16 will have a wall thickness of about 0.25 to 1.5 mm. Preferably, the wall thickness of the non-conductive nylon tube 16 is about 0.4 to 0.8 mm.

Figure 3:
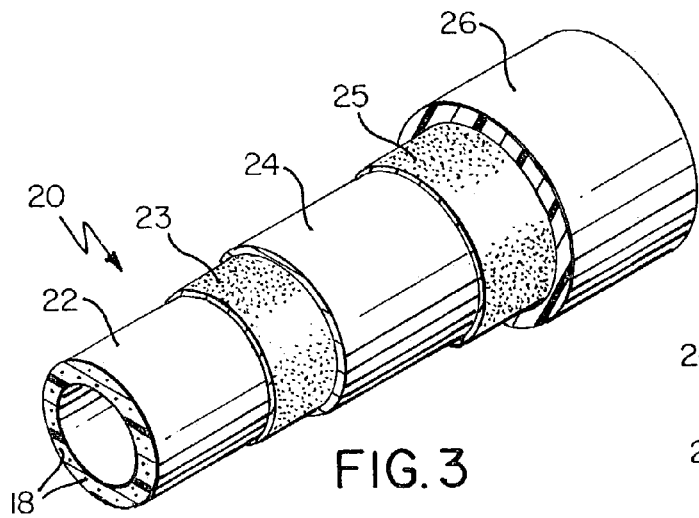
FIG. 3 is a perspective view of another embodiment of the present invention.
Figure 4:
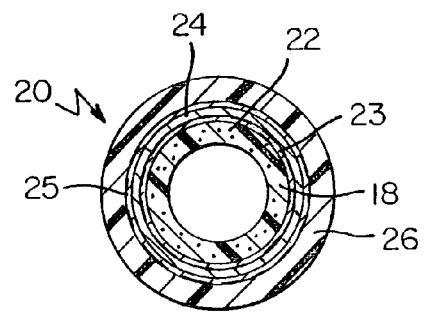
FIG. 4 is an end view of the fuel tube shown in FIG. 3.
Figure 5:
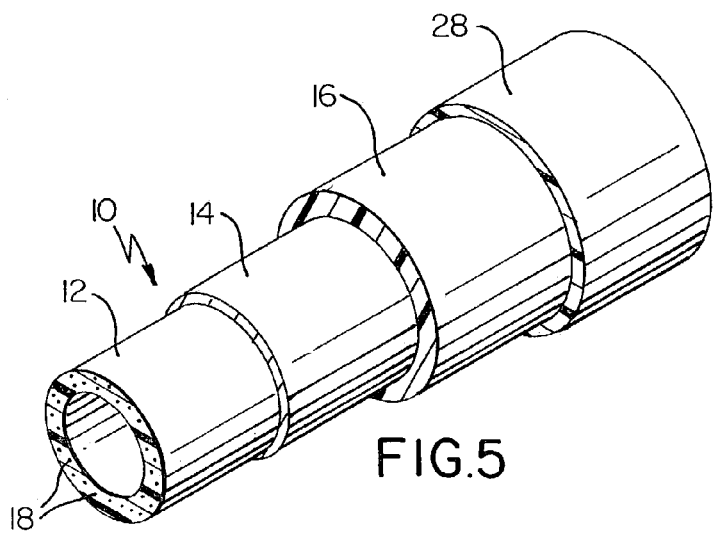
FIG. 5 is a perspective view of still another embodiment of the present invention.
Figure 6:
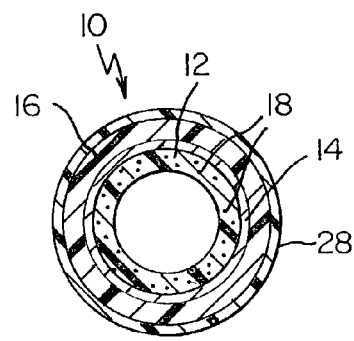
FIG. 6 is an end view of the fuel tube shown in FIG. 5.
Figure 7:
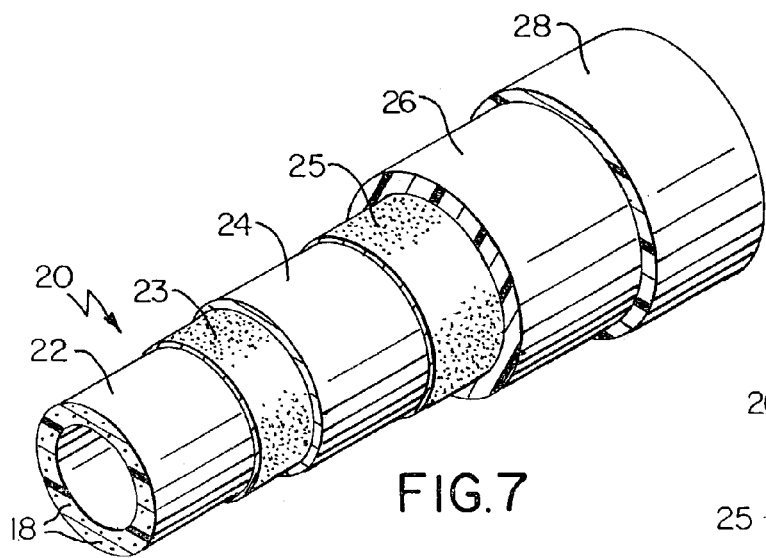
FIG. 7 is a perspective view of yet another embodiment of the present invention.
Figure 8:
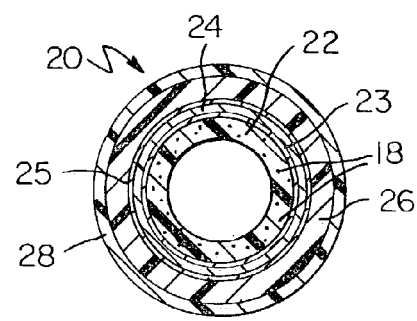
FIG. 8 is an end view of the fuel tube shown in FIG. 7.

FIGS. 3 and 4 illustrate another embodiment of the invention where the hose 20 comprises an inner conductive high density polyethylene tube 22, an aluminum barrier layer 24, a first tie layer 23 between the inner conductive nylon layer 22 and the aluminum barrier layer 24, an outer non-conductive polymeric tube 26, and a second tie layer 25 between the aluminum barrier layer 24 and the outer non-conductive polymeric layer 26. As in the first embodiment, the inner conductive high density polyethylene tube of the second embodiment also contains a conductive agent 18 which is preferably carbon in the form of fibers or fibrils similar to those in the first embodiment. The wall thickness of the tubular members and the aluminum barrier layer of the second embodiment is essentially the same as the thickness of the tubular members and the aluminum barrier layer of the first embodiment.

FIGS. 5–8 illustrate another aspect of the invention, where the tubular structures of both the first embodiment and the second embodiment may also comprise an outer cover 28 adjacent to and surrounding the non-conductive tubular structure 26 of the tube 10. The cover 28 is formed from a rubber or thermoplastic material such as nylon, chlorinated polyethylene; chlorosulfonated polyethylene; styrene-butadiene rubber; butadiene-nitrile rubber; nitrile-polyvinyl chloride; EPDM, neoprene; vinylethylene-acrylic rubber; acrylic rubber; epichlorohydrin rubber; copolymers of epichlorohydrin and ethylene oxide; polychloroprene rubber; polyvinyl chloride; ethylene-propylene copolymers; ultra high molecular weight polyethylene; high density polyethylene; chlorobutyl rubber; and blends thereof. Preferably, the cover is formed from chlorinated polyethylene (CPE). The particular material selected as the outer cover should be chosen according to the environmental condition the hose is expected to encounter. Typically, a wall thickness of about 0.25 to 1.25 mm is sufficient for the cover. The particular tie layer used in the present invention may be any of the adhesive tie layers commonly known in the art and which will adhere the high density polyethylene inner tubular structure to the inner surface of the aluminum barrier layer, and also adhere the outer surface of the aluminum barrier layer to the outer, non-conductive polymeric tube. For example, anhydride-modified linear low density polyethylenes such as those available from DuPont under the name Bynel® or from Mitsui under the name Admer® have been found effective for the materials of the invention.

The adhesive tie layer used between the inner conductive high density polyethylene tube and the aluminum barrier layer may be different from the adhesive used between the outer, non-conductive nylon tube and the aluminum barrier layer. Some adhesive tie layers exhibit better stability toward hydrocarbon fuels than other adhesives, and some adhesives have better adhesion properties than others. Therefore, it may be desirable to use an adhesive tie layer having good hydrocarbon fuel stability between the inner conductive, high density polyethylene layer and the aluminum barrier layer even though other adhesive tie layers may adhere better to the high density polyethylene and the aluminum, whereas, one may choose an adhesive tie layer having better adhesion characteristics and less stability toward hydrocarbon fuels to adhere the outer non-conductive, polymeric tube to the aluminum layer since this adhesive would be on the opposite side of the aluminum barrier layer and, therefore, would not be subjected to the hydrocarbon fuel vapors.

A method of producing the fuel transfer hose of the first embodiment of the present invention comprises the steps of:
    forming a first non-conductive high density polyethylene tube;
    applying a thin layer of aluminum around the outer surface of the high density polyethylene tube; and
    forming an outer, non-conductive tube around the aluminum barrier layer.

Typically, the inner conductive high density polyethylene tube and the outer, non-conductive tube are formed by extrusion techniques known in the art. The application of the aluminum barrier layer on the inner conductive tube is accomplished by helical wrapping or by tensional radial curling or by any other method by which the aluminum foil can be effectively applied around the inner, high density polyethylene tube. An alternate method for applying the aluminum layer on the nylon tube is by electrolytic deposition providing that the aluminum can be applied in a sufficient manner and in an amount to provide a satisfactory barrier layer.

The non-conductive polymeric layer can be applied around the aluminum coated high density polyethylene tubular structure by extrusion techniques known in the art. Other additives such as antioxidants, processing aids, etc., can be employed in amounts and methods known in the art.

Having described the invention in detail and by reference to preferred embodiments thereof, it will be apparent to those skilled in the art that modifications and variations are possible without departing from the scope of the invention defined in the appended claims.

What is claimed is:

1. A fuel transport tube having improved fuel vapor permeation, said tube consisting of:
    an inner conductive high density polyethylene tubular structure having an inner surface and an outer surface;

an aluminum barrier layer having an inner surface and an outer surface disposed on the outer surface of said inner high density polyethylene tubular structure;

an outer non-conductive polymeric tubular structure having an inner surface and an outer surface disposed on the outer surface of said aluminum layer, wherein said outer non-conductive polymeric tubular structure is a thermoplastic or rubber material selected from the group consisting of chlorinated polyethylene; chlorosulfonated polyethylene; styrene-butadiene rubber; butadiene-nitrile rubber; nitrile-polyvinyl chloride; EPDM, neoprene; vinylethylene-acrylic rubber, acrylic rubber; epichlorohydrin rubber; copolymers of epichlorohydrin and ethylene oxide; polychloroprene rubber; polyvinyl chloride; ethylene-propylene copolymers; ultra high molecular weight polyethylene; high density polyethylene; chlorobutyl rubber; and blends thereof; and a tie layer between at least one layer of:

(1) the outer surface of said conductive inner high density polyethylene tubular structure and the inner surface of said aluminum barrier layer, and (2) the outer surface of said aluminum barrier layer and the inner surface of said non-conductive polymeric tubular structure.

2. The tube of claim 1, wherein said inner conductive high density polyethylene tubular structure has a thickness of about 0.2 to 2 mm.

3. The tube of claim 1, wherein said inner conductive high density polyethylene tubular structure has a thickness of about 0.2 to 1.5 mm.

4. The tube of claim 1, wherein said inner conductive high density polyethylene tubular structure contains a conductive agent.

5. The tube of claim 4, wherein said conductive agent is (a) carbon or (b) a metal selected from the group consisting of copper, silver, gold, nickel, and alloys thereof.

6. The tube of claim 5, wherein said conductive agent is carbon in the form of carbon fibers or carbon fibrils.

7. The tube of claim 4, wherein said conductive agent is present in an amount of about 2 to 20 weight percent.

8. The tube of claim 1, wherein said aluminum barrier layer has a thickness of about 0.02 to 1.5 mm.

9. The tube of claim 1, wherein said aluminum barrier layer is applied to said outer surface of said inner conductive high density polyethylene tubular structure by helical wrapping or by tensional radial curling.

10. The tube of claim 1, wherein said outer non-conductive polymeric tubular structure has a wall thickness of about 0.25 to 1.5 mm.

11. The tube of claim 1 wherein said outer non-conductive polymeric tubular structure is constructed of high density polyethylene.

12. The tube of claim 1, wherein said tie layer is disposed between the outer surface of said conductive inner high density polyethylene tubular structure and the inner surface of said aluminum barrier layer.

13. The tube of claim 12, wherein said tie layer is an anhydride-modified linear low density polyethylene.

14. The tube of claim 1, wherein said tie layer is disposed between the outer surface of said aluminum barrier layer and the inner surface of said non-conductive polymeric tubular structure.

15. The tube of claim 14, wherein said tie layer is an anhydride-modified linear low density polyethylene.

16. A fuel transport tube having improved fuel vapor permeation, said tube consisting of in order:

a conductive inner high density polyethylene tubular structure containing about 2 to 20% carbon in the form of fibers or fibrils, said conductive inner high density polyethylene tubular structure having a thickness of about 0.2 to 1.5 mm;

a first anhydride-modified linear low density polyethylene tie layer;

an aluminum barrier layer having an inner surface and an outer surface, said aluminum barrier layer having a thickness of about 0.02 to 1.5 mm;

a second anhydride-modified linear low density polyethylene tie layer; and in outer non-conductive high density polyethylene tubular structure, said outer non-conductive high density polyethylene tubular structure having a thickness of about 0.25 to 1.5 mm.

* * * * *